United States Patent [19]
Maieli et al.

[11] Patent Number: 5,673,962
[45] Date of Patent: Oct. 7, 1997

[54] AUXILIARY SANITARY TOILET FACILITY FOR A RECREATIONAL VEHICLE

[76] Inventors: Joseph R. Maieli; Alberta Maieli, both of 12 Woodlawn Ave., Central Islip, N.Y. 11722

[21] Appl. No.: 507,146

[22] Filed: Jul. 26, 1995

[51] Int. Cl.[6] ................................................. B60R 11/00
[52] U.S. Cl. ............................................ 296/164; 296/26
[58] Field of Search ......................... 296/26, 24.1, 164, 296/165, 174

[56] References Cited

U.S. PATENT DOCUMENTS

| | | |
|---|---|---|
| 4,868,936 | 9/1989 | Crocoli .................................... 4/663 |
| 4,957,323 | 9/1990 | Johnson .................................. 296/181 |

FOREIGN PATENT DOCUMENTS

| | | | |
|---|---|---|---|
| 2601609 | 7/1977 | Germany ............................. | 296/26 |
| 2001589 | 2/1979 | United Kingdom ................. | 296/26 |

*Primary Examiner*—Joseph D. Pape
*Attorney, Agent, or Firm*—Michael I. Kroll

[57] ABSTRACT

An auxiliary sanitary toilet facility for a recreational vehicle comprising a shelter with components for supporting the shelter on the recreational vehicle. A toilet is located within the shelter, while an accessing structure is provided for the shelter, so that a person can enter the shelter and use the toilet.

9 Claims, 4 Drawing Sheets

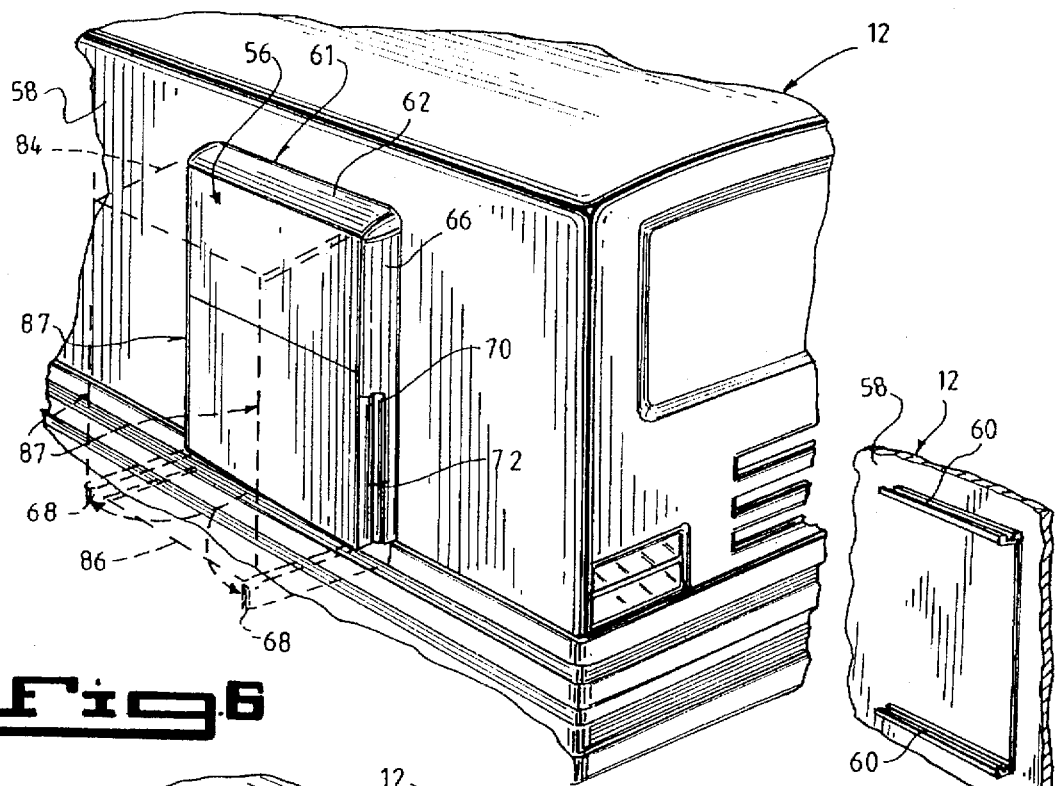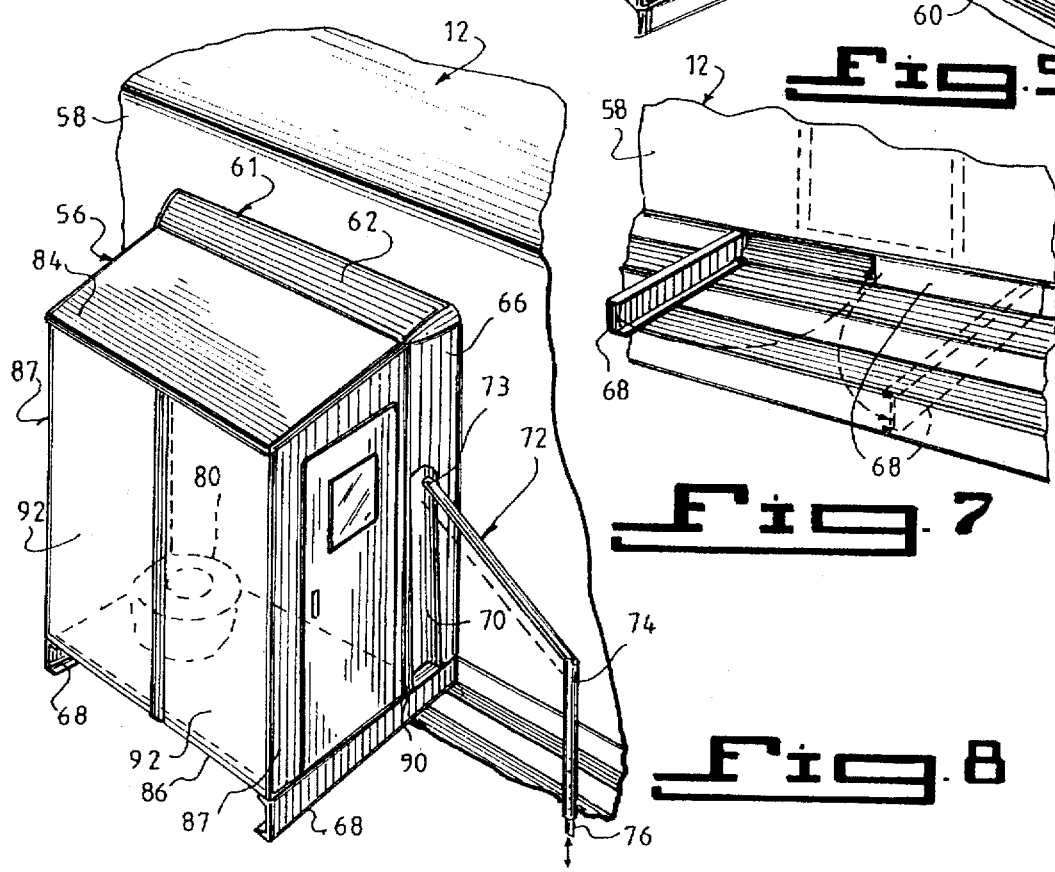

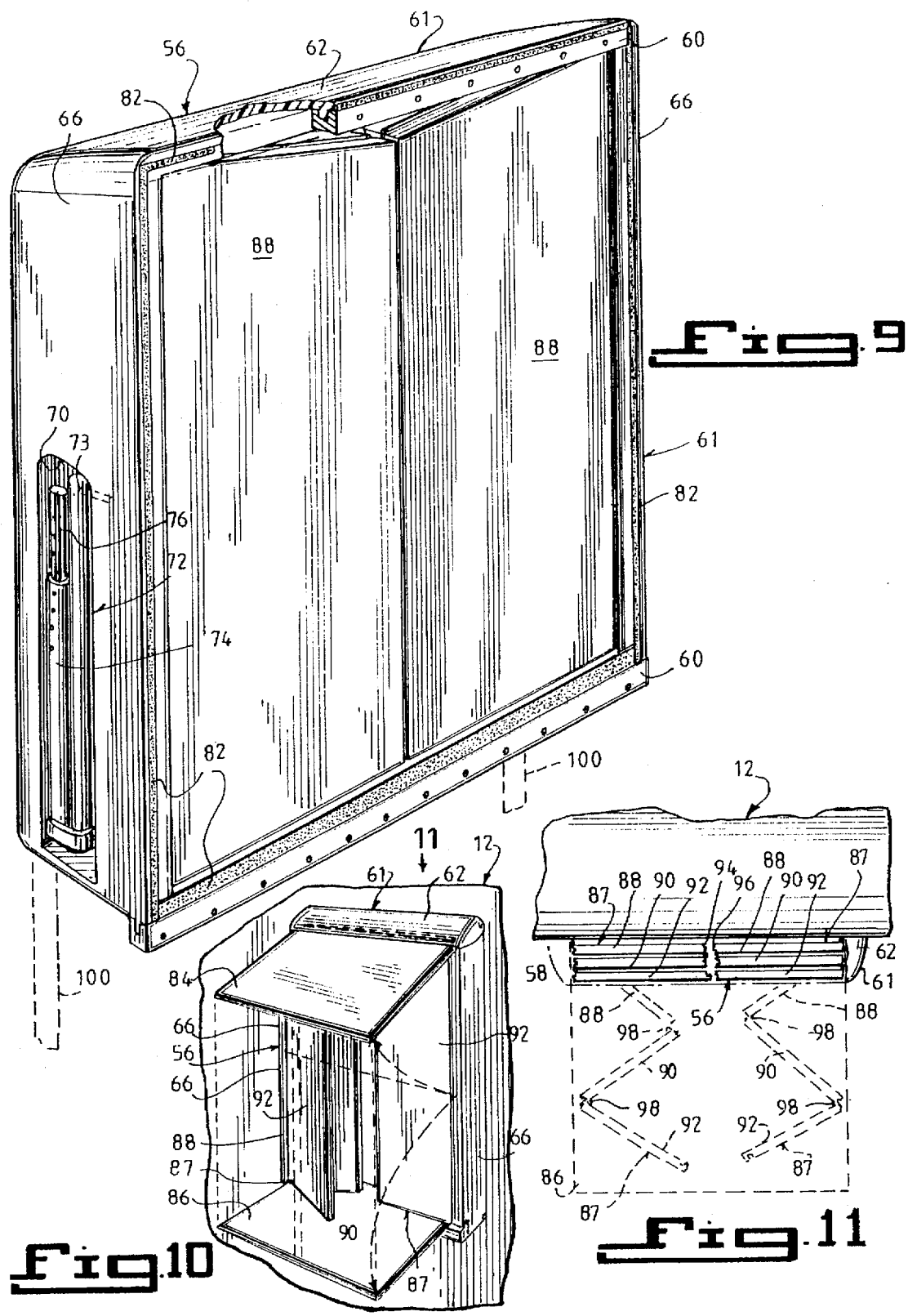

5,673,962

AUXILIARY SANITARY TOILET FACILITY FOR A RECREATIONAL VEHICLE

BACKGROUND OF THE INVENTION

1. Field of the Invention

This invention relates generally to toilets and more specifically it relates to an auxiliary sanitary toilet facility for a recreational vehicle. With the advent of increased comfort and capabilities in modern recreational vehicles, certain limitations have come to light that have not kept pace with the otherwise expanding living capabilities inherent in such vehicles. As an example, many recreational vehicles have substantially increased the living area available to the occupants of these vehicles when such vehicles are not travelling by incorporating what has commonly been referred to as "slide outs". These expandable areas offer dramatic increases in the living area available to the occupants with little or no effect on the vehicles mobility. As a consequence, these vehicles can move better, accommodate an increased number of occupants or in the alternative, provide increased living space, convenience and comfort for the occupants. A noteworthy exception has been the lack of additional toilets for the occupants of such vehicles.

2. Description of the Prior Art

In this connection, the users of recreational vehicles are still constrained by the limitations which exist in toilet accommodations normally furnished aboard the vehicles, so that despite the improved comforts and conveniences that have been incorporated, the availability of a single toilet poses a severe limitation.

The severity of this limitation is brought into sharper focus in situations where such recreational vehicles are equipped with what is generally referred to as "pass through" bathrooms". In such floor plan arrangements, there are a substantial number of advantages to having a "pass through" bathroom, but use of the toilet located therein is hampered by the inability to utilize the toilet to gain access to other parts of the recreational vehicle, when the toilet is in use or alternatively the loss of privacy that attends such circumstances. Although these shortcomings could be addressed with the provision of multiple toilets, doing so would impose impractical space requirements that would have an adverse effect on the practical utilization of floor space.

SUMMARY OF THE INVENTION

In addition, since most recreational vehicles contemplate communal living in the outdoors, as is evidenced by the proliferation of many outdoor accessible conveniences that are now commonly found on such vehicles, such as outdoor picnic tables, entertainment centers, hot and cold water access, refrigeration and the like, it would seem advantageous to provide outside access to an auxiliary sanitary toilet facility as well.

A primary object of the present invention is to provide an auxiliary sanitary toilet facility for a recreational vehicle that will overcome the shortcomings of the prior art devices.

Another object is to provide an auxiliary sanitary toilet facility that can be incorporated into the basic recreational vehicle configuration or added to an existing recreational vehicles without materially effecting the mobility of the recreational vehicle, when the auxiliary sanitary toilet facility is not in use.

An additional object is to provide an auxiliary sanitary toilet facility that contemplates the use of an existing waste handling systems already built into the recreational vehicle, or the utilization of an independent auxiliary waste handling system.

A still further object is to provide an auxiliary sanitary toilet facility having an extendable housing structure that may be part of or carried by the recreational vehicle.

A still further object is to provide an auxiliary sanitary toilet facility that is accessible from the exterior of the recreational vehicle, from the interior of the recreational vehicle or a combination of both.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWING FIGURES

Various other objects, features and attendant advantages of the present invention will become more fully appreciated as the same becomes better understood when considered in conjunction with the accompanying drawings, in which like reference characters designate the same or similar parts throughout the several views, and wherein:

FIG. 5 is a perspective view of a portion of an exterior wall of the recreational vehicle, showing mounting rails affixed to the exterior wall to position and support the second embodiment thereto.

FIG. 6 is a perspective view with parts broken away of a second embodiment of the present invention affixed to the exterior wall of the recreational vehicle, showing deployment of support members for the extendable housing structure in dotted lines.

FIG. 7 is a perspective view with parts broken away, showing the support members integrated into the exterior wall of the recreational vehicle.

FIG. 8 is a perspective view with parts broken away, showing the second embodiment affixed to the exterior wall of the recreational vehicle and deployed in its operative extended position.

FIG. 9 is an enlarged perspective view of the second embodiment, showing the framework that would be placed against the exterior wall of the recreational vehicle and the mounting rails which are detached, in an operative engagement with the extendable housing structure.

FIG. 10 is a perspective view with parts broken away, showing the second embodiment in the first stages of partial deployment to an operative position from the side wall of the recreational vehicle.

FIG. 11 is a top view taken in the direction of arrow 11 in FIG. 10 with parts broken away, showing the hinged side wall panels in a collapsed travel position and also in a partially deployed position, shown in dotted lines.

Similar reference characters denote corresponding features consistently throughout the attached drawings.

DETAILED DESCRIPTION OF THE PRESENT INVENTION

Figure 1:
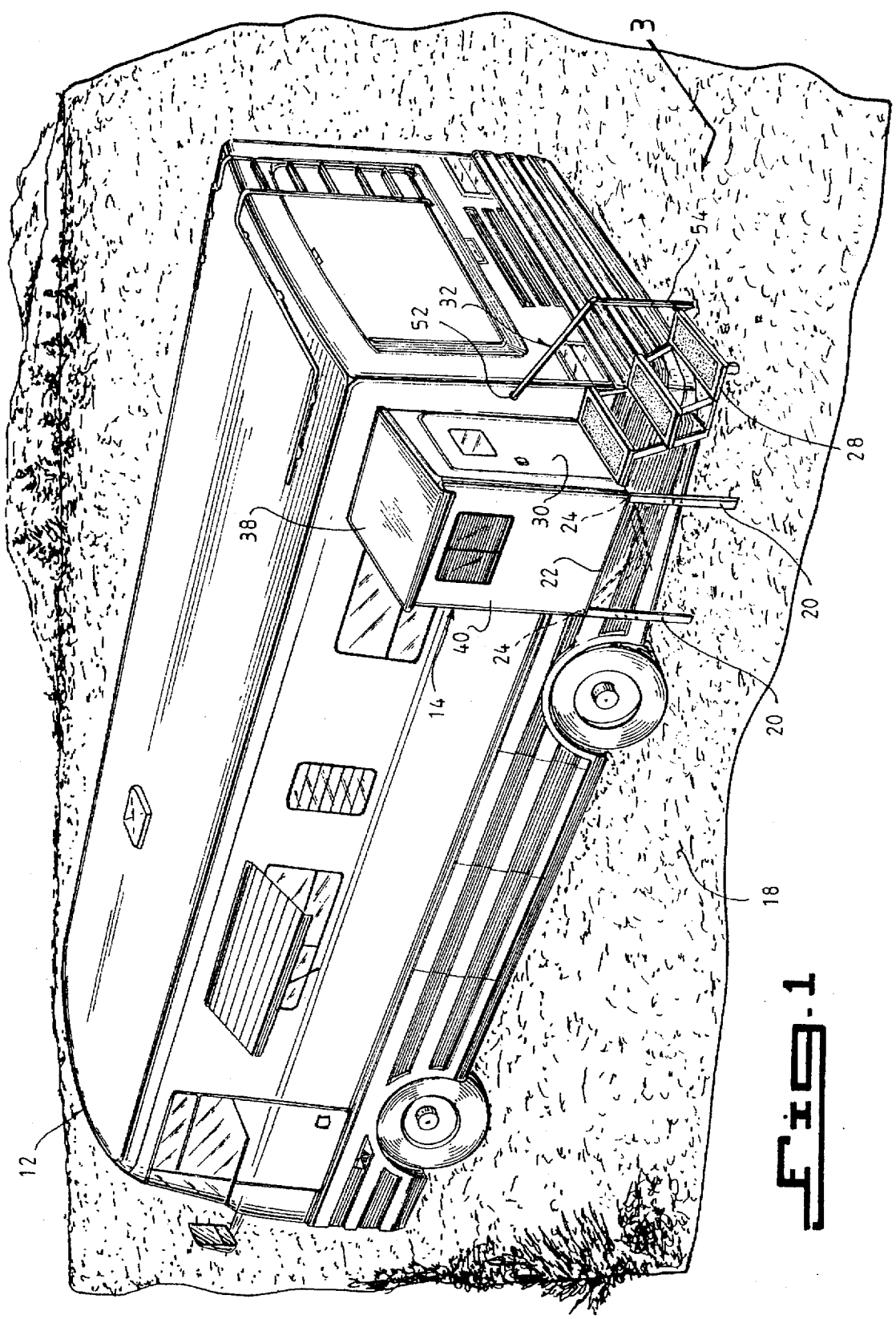
FIG. 1 is a perspective view of a recreational vehicle, showing a first embodiment of the present invention being an extendable housing structure with a toilet installed thereto.

Turning now descriptively to the drawings, in which similar reference characters denote similar elements throughout the several views, FIGS. 1 through 4 illustrates a recreational vehicle 12 of the self propelled type commonly referred to as a motor home. The recreational vehicle 12 is depicted in a stationary position and is shown with a first embodiment of an auxiliary sanitary toilet facility being an extendable housing structure 14 that maintains a toilet 16 therein. The extendable housing structure 14 is elevated above the terrain 18 and may be supported thereon by one or more retractable and adjustable legs 20. The legs 20 may be hinged at a base 22 of the extendable housing structure 14 by hinges 24 in order to permit the legs 20 to swing up and be tucked beneath a floor 26 of the extendable housing structure 14, so that the entire structure 14 may be retracted by well known means, into the recreational vehicle 12.

The mechanism necessary to accommodate the extendable housing structure 14, as well as to facilitate its extension, retraction and locking are well known in the industry and has been pioneered and perfected by Winnebago Industries, a leading and well known manufacturer of such recreational vehicles.

A retractable staircase 28 extends from the base 22 of the extendable housing structure 14 to permit access to an entrance door 30 to enter the extendable housing structure 14 without entering the interior of the recreational vehicle 12. This enables direct access to the extendable housing structure 14 from outside the recreational vehicle 12, thereby permitting the ultimate convenience of access and privacy afforded by the extendable housing structure 14 to the toilet 16 contained therein. A removable socket mounted handrail 32 may be situated adjacent to the retractable staircase 28 for the safety and convenience of those using this entrance. Obviously well known means may be provided for varying the sizes and lengths of all extendable and retractable elements, to assure accommodation to any specific recreational vehicle 12 and to support the structures at different levels of the terrain 18.

Figure 2:
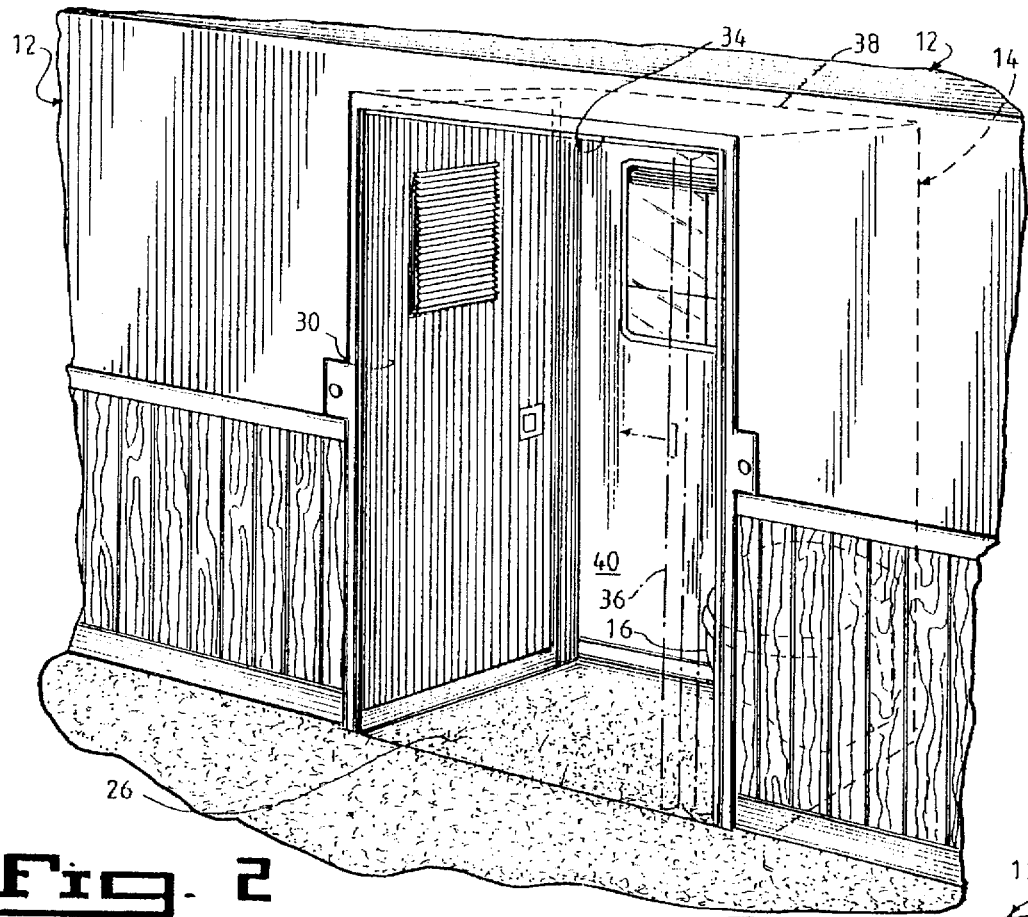
FIG. 2 is an enlarged perspective view of the interior of the recreational vehicle broken away, showing the first embodiment having access from the interior of the recreational vehicle.

In FIG. 2, the extendable housing structure 14 is illustrated with a passageway 34 from the interior of the recreational vehicle 12. A door 36 is shown in phantom lines and may be used to close off the passageway 34 to the extendable housing structure 14 from the interior of the recreational vehicle 12. The door 36 is shown as an accordion folding door, however, it should be understood that other closure means, such as a solid door (not shown) can be substituted for the door 36.

The extendable housing structure 14 equipped with the toilet 16, can be accessible from outside the vehicle 12 by use of the entrance door 30. In such an arrangement, the integral retractable staircase 28 is of the type well known and used in the recreational vehicle industry to facilitate entrance and exit to the elevated extendable housing structure 14 maintaining the toilet 16.

Figure 3:
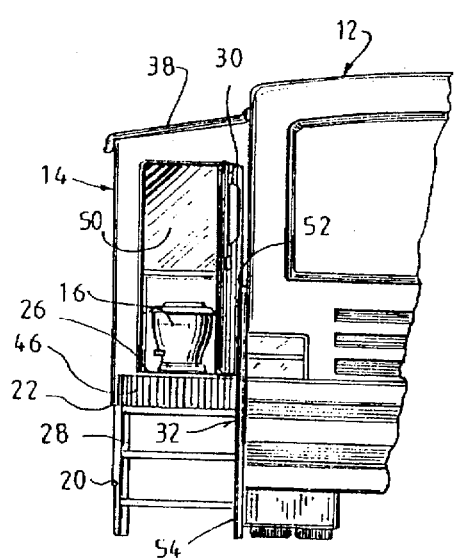
FIG. 3 is a side view taken in the direction of arrow 3 in FIG. 1 with the recreational vehicle broken away, showing the first embodiment having access from the exterior of the recreational vehicle.
Figure 4:
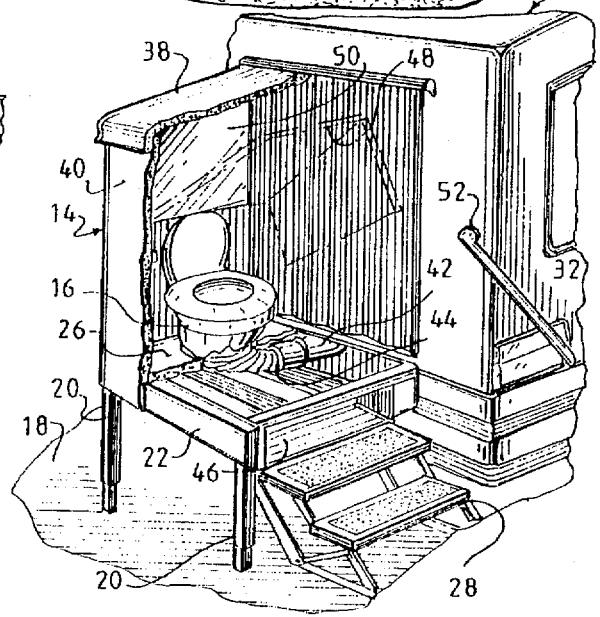
FIG. 4 is a perspective view with parts broken away of the first embodiment having access from the interior and exterior of the recreational vehicle and indicating the toilet having communication with the existing plumbing system.

In FIG. 4 a portion of a roof 38, side wall 40 and floor 26 of the extendable housing structure 14 are broken away to reveal how the toilet 16 might be connected to an existing plumbing system 42. By using a telescoping and flexible plumbing connection 44, the toilet 16 can be extended together with the extendable housing structure 14 into its operative position, as best shown in FIGS. 1, 2, 3 and 4. It will also be noted that the aforementioned retractable staircase 28 is extended from a recessed area 46 between the base 22 and floor 26 of the extendable housing structure 14, so that the entire extendable housing structure 14 and the staircase 28 may be retracted into the body of the recreational vehicle 12.

As indicated in FIG. 4, the toilet 16 may be shielded from view by means of a collapsible hinged cover 48, shown in phantom lines in a partially extended position. In such an arrangement, the hinged cover 48 can serve as a table or convenience surface while at the same time shield the toilet 16 when it is not in use. In the present configuration the cover 48 may be equipped with an inner mirrored surface 50, so that when the cover 48 is lifted up to access the toilet 16 as it appears in FIG. 4, the mirrored surface 50 will create a spacious atmosphere as well as to lend further convenience to users of the toilet 16 of the present invention.

It should be understood that although the auxiliary toilet 16 has been shown in FIG. 4 as being connected to the recreational vehicle plumbing system 42, it is contemplated that a self contained portable toilet (not shown), but widely known and readily available may be placed within the extendable housing structure 14 and conveniently used in the normal fashion. In such an arrangement the self contained portable toilet would be completely independent from the recreational vehicle plumbing system 42 for ready access without the complexities attendant to the connection of the toilet 16 with the recreational vehicles existing plumbing system 42. Furthermore, the availability of a self contained toilet could also serve as a back up in the event that the recreational vehicle holding tanks are full or have suffered from some system malfunction.

The removable handrail 32 may be accommodated and received by a socket 52 to assist those entering or exiting from the extendable housing structure 14 from the exterior of the recreational vehicle 12. As best seen in FIGS. 1 and 3, the handrail 32 may be provided with a pivotable and adjustable leg 54 to contact the terrain 18 over which the extendable housing structure 14 is situated, thereby assuring a hand hold for those using the retractable staircase 28 to gain access to the toilet 16.

Of course, it should be obvious that any convenient independent step ladder, stool or the like (not shown) can be used in place of the retractable staircase 28.

Thus far the use of an extendable housing structure 14 in association with a recreational vehicle 12, has been described where the extendable housing structure 14 might or might not be accessible from the interior of the recreational vehicle 12. However, in keeping with the present invention, it is also contemplated that an "add on" housing structure 14 can be used to furnish the benefits of this invention to an existing recreational vehicle 12. In this connection, reference is made to FIGS. 5 and 6, showing a second embodiment wherein the recreational vehicle 12 is shown with a foldout enclosure 56 affixed to an exterior side wall 58 of the recreational vehicle 12. To facilitate such an arrangement a pair of mounting rails 60 may be affixed to the exterior side wall 58 of the recreational vehicle 12. The mounting rails 60 may be secured to the recreational vehicle 12 in a manner well known to those skilled in the art.

As seen in FIG. 6, the foldout enclosure 56 is adapted to slide onto the mounting rails 60 and clap thereto in any well known fashion (not shown). It is contemplated that the foldout structure 56 would be constructed of any rigid lightweight materials, such as those presently in use, which may be sandwich structures with honeycomb or foam materials known to have a high strength to weight ratio.

FIGS. 6 and 8 illustrate the foldout enclosure 56, which includes a rigid frame 62 having a roof cap 64, and two vertical ends 66. The rigid frame 61 may be molded or formed to be esthetically pleasing and or molded in a fashion so as to blend with the exterior shape of the recreational vehicle 12, to which the foldout enclosure 56 may be affixed. In addition, as best indicated in FIGS. 6, 7 and 8, the recreational vehicle 12 may be provided with hinged support members 68, which can extend beneath the foldout enclosure 56 to help support it above the terrain 18. As best seen in FIGS. 6 and 8, one vertical end 66 may be provided with a recess 70, that can accommodate an extendable handrail 72 which can be pivotally mounted therein at 73 and operate in the same manner as previously described with respect to the handrail 32. That is to say a rotatable lower leg 74, best seen in FIG. 8, may be moved to a downward position, and a telescoping foot 76 with cooperating spring detents (not shown), can be placed in contact with the surface of the terrain 18 to assist those entering and exiting from the foldout enclosure 56. In FIG. 8, it will be noted that the foldout enclosure 56 is also provided with an access door 78, to permit ingress and egress to a toilet 80 in the foldout enclosure 56 when it is deployed, via a retractable staircase similar to the staircase 28 described above.

It should also be understood that the pivotally mounted supports 68 could be replaced by a plurality of retractable and adjustable leg supports fastened to the lower portion of the foldout enclosure 56, such as the legs 20, as seen in previous FIGS. 1, 3 and 4.

Referring now to FIG. 9, the face of the foldout enclosure 56 which is mated against the exterior side wall 58 of a recreational vehicle 12 is depicted in a perspective view and cooperatively engaging the aforementioned mounting rails 60. As will be noted in FIG. 9, a weather seal gasket 82 is provided about the perimeter of the surface of the rigid frame 62 that would contact the exterior side wall 58 of the recreational vehicle 12, such that when the rigid frame 62 of the enclosure 56 is placed against the recreational vehicle 12 a weather tight seal will be attained.

Reference is made to FIGS. 8, 10 and 11, which shows the foldout enclosure 56 in detail. Essentially the foldout enclosure 56 is provided with a hinged roof 84, a hinged floor 86, each pivotally supported from the rigid frame 62. A pair of folding vertical side walls 87 are provided, in which each vertical side wall consists of three panels 88, 90 and 92, as best seen in FIG. 11. These vertical panels are hinged at one end to the rigid frame 62 and may be provided with a dove tail edges 94 and 96, which when in the open position form a weather tight seal between the adjacent hinged panels. As will be noted in FIG. 11, vertically disposed piano hinges 98 are fastened to one edge of each of the adjacent vertical panels, to facilitate an accordion like operation of the panels, such that when fully deployed, they cooperate with the roof 84 and the floor 86, to provide a weather tight seal.

To help support the foldout enclosure 56 a plurality of retractable telescoping support members 100 may be provided, in which a pair are indicated in dotted lines in FIG. 10. Obviously, the retractable support members 100 would be incorporated within the lower extremities of the foldout enclosure 56 in any well known fashion, so that their positioning therein would not detract from the overall appearance of the foldout enclosure 56 when not in use.

In conclusion, the auxiliary sanitary toilet facility being the first embodiment shown in FIGS. 1 to 4, and the second embodiment shown in FIGS. 6 and 8 to 11, greatly enhances the convenience and practicability of any recreational vehicle 12 to which it may be applied. Moreover, utilization of the invention in the manner prescribed elevates the recreational vehicle 12 to new heights of luxury and marketability.

| LIST OF REFERENCE NUMBERS | |
|---|---|
| 12 | recreational vehicle |
| 14 | extendable housing structure on 12 |
| 16 | toilet in 14 |
| 18 | terrain |
| 20 | retractable and adjustable leg |
| 22 | base of 14 |
| 24 | hinge between 20 and 22 |
| 26 | floor of 14 |
| 28 | retractable staircase |
| 30 | entrance door of 14 |
| 32 | removable socket mounted handrail |
| 34 | passageway in 12 |
| 36 | door in 34 |
| 38 | roof of 14 |
| 40 | side wall of 14 |
| 42 | existing plumbing system in 12 |
| 44 | telescoping and flexible plumbing connection |
| 46 | recessed area between 22 and 26 |
| 48 | collapsible hinged cover |
| 50 | inner mirrored surface on 48 |
| 52 | socket of 32 |
| 54 | adjustable leg of 32 |
| 56 | foldout enclosure on 12 |
| 58 | exterior side wall of 12 |
| 60 | mounting rails |
| 62 | rigid frame of 56 |
| 64 | roof cap of 61 |
| 66 | vertical end of 62 |
| 68 | hinged support member |
| 70 | recess in 66 |
| 72 | extendable handrail in 70 |
| 73 | pivot for 72 |
| 74 | rotatable lower leg of 72 |
| 76 | telescoping foot of 72 |
| 78 | entrance door of 56 |
| 80 | toilet in 56 |
| 82 | weather seal gasket on 62 |
| 84 | hinged roof of 56 |
| 86 | hinged floor of 56 |
| 87 | vertical side wall of 56 |
| 88 | first panel of 87 |
| 90 | second panel of 87 |
| 92 | third panel of 87 |
| 94 | dovetail edge |
| 96 | dovetail edge |
| 98 | piano hinge |
| 100 | retractable telescoping support member |

What is claimed is:

1. An auxiliary sanitary toilet facility for a recreational vehicle comprising:
   a) a shelter which is an extendible housing structure;
   b) means for supporting said shelter on the recreational vehicle;
   c) a toilet located within said shelter; and
   d) means for accessing said shelter, so that a person can enter said shelter and use said toilet, wherein said accessing means includes:
      i) an entrance door in one side of said extendible housing structure; and
      ii) a retractable staircase extending from a base of said extendible housing structure to permit access through said entrance door, so as to allow a person to enter said extendible housing structure independently from the recreational vehicle.

2. An auxiliary sanitary toilet facility for a recreational vehicle as recited in claim 1, wherein said supporting means includes a plurality of retractable and adjustable legs extending from a base of said extendable housing structure to the terrain.

3. An auxiliary sanitary toilet facility for a recreational vehicle as recited in claim 2, wherein each said leg is hinged to said base to permit said leg to swing up and be tucked beneath a floor of said shelter, so that said entire shelter may be retracted into the recreational vehicle.

4. An auxiliary sanitary toilet facility for a recreational vehicle as recited in claim 1, wherein said accessing means is a passageway from the interior of the recreational vehicle into said extendable housing structure.

5. An auxiliary sanitary toilet facility for a recreational vehicle as recited in claim 4, wherein said accessing means further includes a door in said passageway to close off said extendable housing structure from the interior of the recreational vehicle.

6. An auxiliary sanitary toilet facility for a recreational vehicle as recited in claim 1, wherein said accessing means further includes a removable socket mounted handrail on the recreational vehicle adjacent to said retractable staircase for the safety and convenience for a person using said entrance door.

7. An auxiliary sanitary toilet facility for a recreational vehicle as recited in claim 1, wherein said toilet includes a telescoping and flexible plumbing connection coupled to an existing plumbing system in the recreational vehicle.

8. An auxiliary sanitary toilet facility for a recreational vehicle comprising:

a) a shelter;

b) means for supporting said shelter on the recreational vehicle;

c) a toilet located within said shelter;

d) means for accessing said shelter, so that a person can enter said shelter and use said toilet; and e) a collapsible hinged cover within said shelter that can serve as a table with a convenience surface, while at the same time shield said toilet when it is not in use.

9. An auxiliary sanitary toilet facility for a recreational vehicle as recited in claim 8, wherein said cover includes an inner mirrored surface, so that when said cover is lifted up to access said toilet said mirrored surface will create a spacious atmosphere as well as to lend a further convenience to a person using said toilet.

* * * * *